(12) United States Patent
Kuklinski

(10) Patent No.: US 6,951,179 B1
(45) Date of Patent: Oct. 4, 2005

(54) BOILING HEAT TRANSFER SURFACE

(75) Inventor: Robert Kuklinski, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/911,746

(22) Filed: Jul. 30, 2004

(51) Int. Cl.[7] .................................................. B63B 1/34
(52) U.S. Cl. .................................... 114/67 A; 102/399
(58) Field of Search ........................ 114/67 A; 102/399

(56) References Cited

U.S. PATENT DOCUMENTS

| | | | |
|---|---|---|---|
| 3,075,489 A * | 1/1963 | Eichenberger | 114/67 A |
| 3,205,846 A * | 9/1965 | Lang | 114/67 A |
| 3,392,693 A * | 7/1968 | Hulsebos et al. | 114/20.1 |
| 3,435,796 A * | 4/1969 | Merrill | 114/67 R |
| 3,455,266 A * | 7/1969 | Giles | 114/67 A |
| 6,684,801 B1 * | 2/2004 | Kuklinski | 114/67 A |

* cited by examiner

*Primary Examiner*—Jesus D. Sotelo
(74) *Attorney, Agent, or Firm*—James M. Kasischke; Jean-Paul A. Nasser; Michael P. Stanley

(57) ABSTRACT

A system to create and maintain a gas/vapor cavity about a hull surface includes a fence selectively extendable above and below the hull surface. A gas venting means is positioned beneath the hull surface downstream from the fence. The vented gas can be used to create a gas/vapor cavity downstream from said fence and cover the hull surface. A heat source is also positioned downstream from the fence and beneath the hull surface. The heat source is capable of heating the hull surface to create or maintain the gas/vapor cavity on the hull surface. A sensor and controller can also be provided to control the cavity.

14 Claims, 1 Drawing Sheet

BOILING HEAT TRANSFER SURFACE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates generally to a system for increasing the performance of aquatic vehicles. More particularly, this invention relates to a system for a vehicle that creates and maintains a gas/vapor cavity to reduce drag and increase propulsion efficiency. The gas/vapor cavity can also be used to reduce noise received by a sonar system.

(2) Description of the Prior Art

Undersea vehicles, such as torpedoes, are restricted in speed and range by the size of their power plants and amount of fuel they carry. Another significant factor limiting performance is the amount of drag created as the vehicles go through water. Considerable research by designers of aquatic vehicles to reduce drag is ongoing, but acceptable results are still being sought.

Thus, in accordance with this inventive concept, a need has been recognized in the state of the art a system to create and maintain a gas/vapor cavity on the hull of an aquatic vehicle to reduce drag and thereby increase system efficiency.

OBJECTS AND SUMMARY OF THE INVENTION

The first object of the invention is to provide a system for reducing drag and increasing propulsion efficiency of an aquatic vehicle.

Another object is to provide a system for reducing drag and increasing propulsion efficiency on a undersea vehicle using ventilation gas, gas recycling, and heat to create and maintain a controllable, stable gas/vapor cavity.

Another object is to provide a system for reducing drag, increasing propulsion efficiency, and isolating a sonar array from self-generated noise of the aquatic vehicle.

These and other objects of the invention will become more readily apparent from the ensuing specification when taken in conjunction with the appended claims.

Accordingly, the present invention is a system to create and maintain a gas/vapor cavity about a hull surface of an aquatic vehicle which includes a fence selectively extendable above and below the hull surface. A gas venting means is positioned beneath the hull surface downstream from the fence. The vented gas can be used to create a gas/vapor cavity downstream from said fence and cover the hull surface. A heat source is also positioned downstream from the fence and beneath the hull surface. The heat source is capable of heating the hull surface to create or maintain the gas/vapor cavity on the hull surface. A sensor and controller can also be provided to control the cavity.

BRIEF DESCRIPTION OF THE DRAWINGS

A more complete understanding of the invention and many of the attendant advantages thereto will be readily appreciated as it becomes better understood by reference to the following detailed description when considered in conjunction with the accompanying drawings wherein like reference numerals refer to like parts and wherein.

DESCRIPTION OF THE PREFERRED EMBODIMENTS

Figure 1:
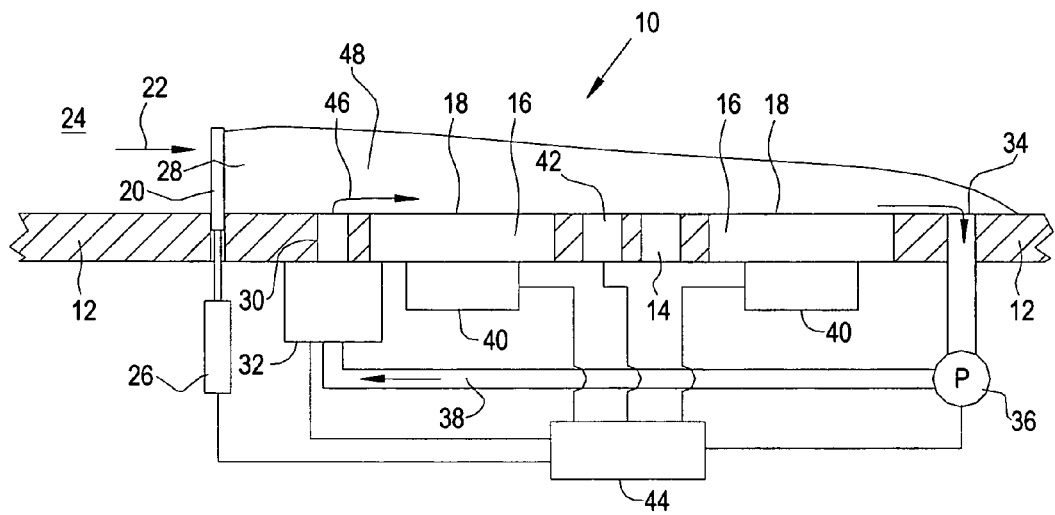
FIG. 1 shows an a system for creating a gas/vapor cavity on an external surface underwater.
Figure 2:
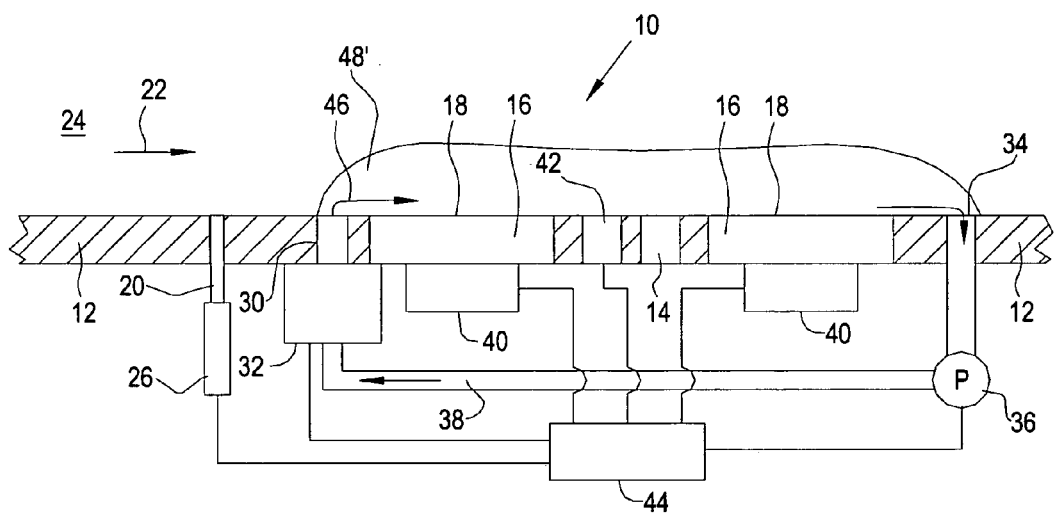
FIG. 2 shows the surface of FIG. 1 with an upstream fence retracted.

FIGS. 1 and 2 show a cross-sectional view of a heat transfer-ventilation system 10 of the invention that can find application on a large underwater surface member 12. A sonar array 14 can be embedded in large surface member 12 and is surrounded by shell elements 16 each having an upper surface 18 that coextends with surface member 12. A deployable upstream fence 20 can be deployed into the flow (shown by arrow 22) of water 24 by an actuator 26. When upstream fence 20 is deployed it creates a wake 28 behind fence 20. A ventilation gas outlet 30 is positioned downstream from fence 20. Ventilation gas outlet 30 is joined to a ventilation gas source 32 inside of surface member 12. Ventilation gas source 32 can be a gas generator, compressed gas storage means or the like. In a preferred embodiment, the invention can include a gas recirculating means including a downstream intake 34, a pump 36 and a recirculating line 38. Heat sources 40 are located under shell elements 16. Heat sources 40 should be capable of generating sufficient heat to maintain environmental water in a vaporous state once the surface has reached that state. Heat sources 40 can utilize waste heat from a vehicle propulsion system or they can utilize chemical or electrical energy to generate this heat. A sensor 42 is positioned in communication with surface 18 to detect heat transfer conditions at surface 18. A controller 44 is joined to sensor 42, actuator 26, ventilation gas source 32, heat sources 40, and pump 36. Controller 44 receives signals from sensor 42 and transmits control signals to actuator 26, ventilation gas source 32, heat sources 40 and pump 36.

In operation, once the water flow 22 exterior to surface 18 reaches a certain velocity, controller 44 activates actuator 26 to deploy fence 20. Deployed fence 20 induces cavitation downstream from fence 20 by creating a pressure drop in water 24. As fence 20 is deployed to extend into flow 22 of water 24, controller 44 activates gas source 32 and ventilation gas (shown by arrow 46) is vented through outlet 30. Ventilation gas 46 helps maintain gas/vapor blanket 48. Controller 44 also activates heat sources 40, and heat is applied to shell elements 16. The temperature of upper surface 18 rises more rapidly because of the decreased heat transfer present in a vapor/solid interface. Thus, gas/vapor blanket 48 can be maintained without use of fence 20 to provide cavitation. Sensor 42 allows monitoring of surface 18 to allow controller 44 to control actuator 26, heat sources 40 and pump 36.

Control of the heat flux from heat sources 40 into shell elements 16 will allow a gas/vapor blanket 48' to surround sonar array 14 even after upstream fence 20 is retracted, as shown in FIG. 2. Sonar array 14 is surrounded by gas/vapor blanket 48' and is thusly isolated to a large degree from shell-borne noise contamination coming from surface member 12. Modification of constituents of system 10 to accommodate a wide variety of other underwater platforms will readily suggest themselves to one skilled in the art.

Heat transfer-ventilation system 10 of the invention provides for decreased drag and results in increased range and speed. System 10 also permits the use of supercavitation at deep depths and can operate over multiple speed ranges during a single run. System 10 decreases the level of self-generated noise and hence increases the performance of the vehicle's sonar arrays.

Heat transfer-ventilation system 10 has the ability to create a gas/vapor cavity 48 over an underwater vehicle. Waste heat onboard the vehicle can be utilized to efficiently and quickly create gas/vapor cavity 48 with a minimum amount of ventilation gas 46. System 10 has means to affect and control the stability of gas/vapor cavity 48 at variable speeds. Heat transfer-ventilation system 10 can use supercavitation to control thermal properties of surface 18 and can cycle between gas/vapor cavities 48 that are recirculated at different speeds for low speed and high speed operation.

It is understood that heat transfer-ventilation system 10 could be made in accordance with this invention in different sizes and configurations for different undersea vehicles without departing from the scope of the invention herein described. System 10 having a means to create gas/vapor cavity 48 and then heating a surface to maintain cavity 48 could be adapted to any underwater and/or surface platform. Heat transfer-ventilation system 10 could be operated over a range of surface temperatures with or without waste heat from an engine. System 10 could be used with or with the recirculation of gas via pump 36. Having this disclosure in mind, selection of suitable components from among many proven contemporary designs and compactly interfacing them as disclosed herein can be readily done without requiring anything beyond ordinary skill.

The components and their arrangements as disclosed herein all contribute to the novel features of this invention. Heat transfer-ventilation system 10 of this invention provides a reliable and cost-effective means to improve the efficiency of undersea vehicles. Therefore, system 20 as disclosed herein is not to be construed as limiting, but rather, is intended to be demonstrative of this inventive concept.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A system to create and maintain a vapor cavity for an underwater vehicle having a hull surface comprising:
    a fence selectively extendable above and below the hull surface;
    means for venting gas positioned beneath the hull surface downstream from said fence, said vented gas capable of creating a gas/vapor cavity downstream from said fence structure and covering the hull surface; and
    a heat source downstream from said fence beneath the hull surface capable of heating the hull surface, said heat source being capable of maintaining the gas/vapor cavity on the hull surface.

2. The system of claim 1 further comprising a sonar array disposed in the hull surface downstream from said fence.

3. The system of claim 1 wherein said system comprises a plurality of said fences, gas venting means and heat sources arranged in a ring about an axis of an underwater vehicle.

4. The system of claim 1 wherein said means for venting gas comprises a gas source in communication with the hull surface.

5. The system of claim 4 wherein said gas source comprises a selected one of a compressed gas source, a gas generator, and a combination of the two.

6. The system of claim 4 wherein said means for venting gas further comprises a means for recirculating gas receiving gas downstream from said heat source.

7. A system to create and maintain a vapor cavity about a hull surface comprising:
    a fence selectively extendable above and below the hull surface;
    an actuator joined to said fence for selectively extending said fence on receipt of an actuator control signal;
    means for venting gas positioned beneath the hull surface downstream from said fence, said means for venting gas capable of receiving a venting control signal, said vented gas capable of creating a gas/vapor cavity downstream from said fence;
    a heat source downstream from said fence structure beneath the hull surface capable of heating the hull surface, said heat source being controlled by a heat source control signal, and said heat source being capable of maintaining the gas/vapor cavity on the hull surface;
    a sensor in communication with the hull surface providing a heat transfer signal representative of the heat transfer condition of the hull surface; and
    a controller joined to receive the heat transfer signal and provide the heat source control signal, the venting control signal, and the actuator control signal in order to control the vapor cavity.

8. The system of claim 7 further comprising a sonar array positioned within the hull surface and capable of being in contact with the generated vapor cavity.

9. The system of claim 7 wherein said means for venting gas comprises:
    a gas source in communication with the hull surface; and
    a gas recirculating means having a downstream input in communication with the hull surface, a pump, and a recirculating conduit in communication with the hull surface.

10. The system of claim 9 wherein the gas source is compressed gas.

11. The system of claim 9 wherein the gas source is a gas generator.

12. The system of claim 7 wherein said heat source is transferred waste heat.

13. The system of claim 7 wherein said heat source is a chemical heat source.

14. The system of claim 7 wherein said heat source is a electrical heat source.

* * * * *